United States Patent [19]

Terracciano

[11] 4,050,447
[45] Sept. 27, 1977

[54] DEEP FAT FRYER HEATED FAT SUPPLY RESERVOIR AND FAT REPLENISHMENT DEVICE

[76] Inventor: Andrew Terracciano, 32 Wayhill Road, Waterford, Conn. 06385

[21] Appl. No.: 689,084

[22] Filed: May 24, 1976

[51] Int. Cl.² .............................................. A47J 27/14
[52] U.S. Cl. ...................................... 126/374; 99/330; 122/456; 126/380; 137/389
[58] Field of Search ................ 126/374, 380; 141/198, 141/95, 230, 284; 137/386, 389, 390; 222/64; 122/456

[56] References Cited

U.S. PATENT DOCUMENTS

| 804,827 | 11/1905 | Corbitt | 122/456 |
| 2,078,641 | 4/1937 | Spencer | 99/330 |
| 2,287,396 | 6/1942 | Roth | 126/380 |
| 3,181,556 | 5/1965 | Baker | 137/389 |
| 3,368,682 | 2/1968 | Boots | 99/330 |

*Primary Examiner*—John J. Camby
*Assistant Examiner*—Larry I. Schwartz

[57] ABSTRACT

An auxiliary fat container near a deep fat fryer lowers to a convenient height for filling with an entire replenishment package of solidified cooking fat.

A heater within the auxiliary container melts and elevates the temperature of the replenishment fat to approximately cooking temperature. A fat level sensor within the deep fat fryer meters the addition of preheated replenishment fat.

4 Claims, 1 Drawing Figure

DEEP FAT FRYER HEATED FAT SUPPLY RESERVOIR AND FAT REPLENISHMENT DEVICE

BACKGROUND OF THE INVENTION

Deep fat fryers are well known. They are used inter alia to cook doughnuts at a temperature of from about 350° to about 375° fahrenheit. As the doughnuts are cooked, they absorb some of the fat thus requiring its replenishment. Replenishment fat is frequently provided in solidified blocks. The blocks are heavy and awkward, and contain more fat than should functionally be added to the fryer at one time. The operator thus customarily adds small amounts at a time using his hands to scoop the solidified fat from the container into the fryer. In addition to being a disagreeable task, hand scooping entails lost time for hand washing after each such replensihment operation. Each time replenishment fat is added, the fat temperature in the fryer is lowered. Frying must be delayed until cooking temperature is again attained.

U.S. Pat. No. 2,078,641, in the name of W.F. Spencer teaches a doughnut cooking machine in which a fat reservoir is mounted over a deep fat fryer. The fat in the reservoir is liquified by heat from the fryer and is metered by float valve into the cooking vessel.

SUMMARY OF THE INVENTION

The present invention teaches an auxiliary fat reservoir sufficiently commodious to contain at least a complete package unit of replenishment fat. The unit is disposed at a height which is convenient to enable manual addition of the replenishment fat to the auxiliary fat reservoir.

A heater elevates the temperature of the fat in the auxiliary fat reservoir to approximately cooking temperature.

A metering device causes the transfer of small amounts of liquified and heated fat from the auxiliary fat reservoir to the fat fryer as needed to replenish the fat used.

DETAILED DESCRIPTION OF THE PREFERRED EMBODIMENT

Figure 1:
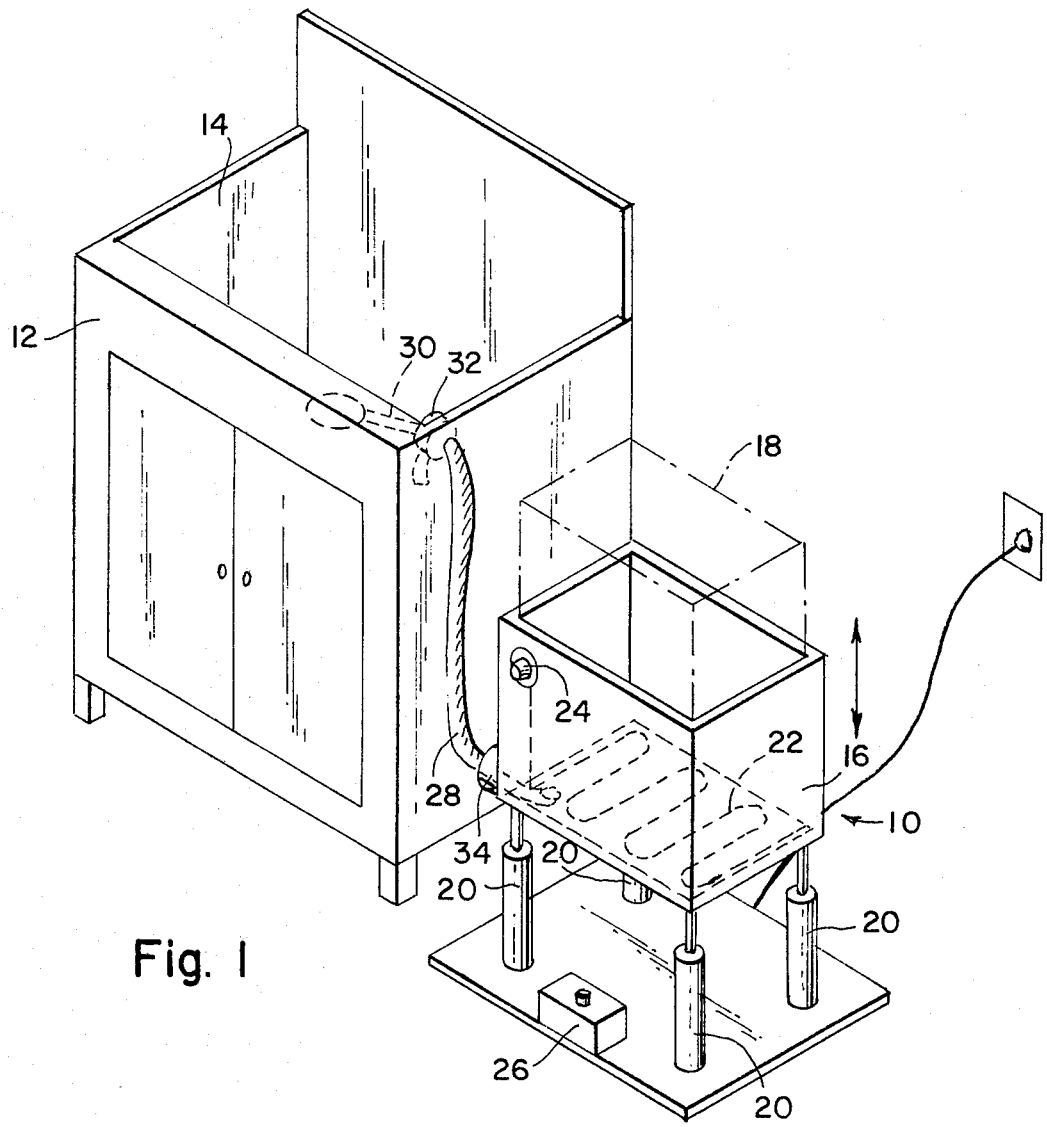
FIG. 1 shows a three-quarters partially schematic view of one embodiment of the auxiliary fat reservoir as operatively connected to a deep fat fryer.

An auxiliary fat reservoir is shown generally at 10 adjacent to a deep fat fryer 12. The deep fat fryer 12 contains a deep frying vessel 14, not part of this invention. The deep fat fryer 12 is heated by means well known.

A supply vessel 16, having enough capacity to contain an entire package of solidified replenishment fat 18 rests on support members 20. The replenishment package of solidified fat 18 is conveniently 25 or 50 pounds or other quantity formed in a paralellipiped shape. The supply vessel 16 is heated to approximately cooking temperature by a heater 22. In the embodiment shown, the heater is an electric heating element controlled by a thermostat 24. Other forms of heaters 22, such as fossil fuel, or heat exchange with the fat in the deep frying vessel 14, will occur to one skilled in the art and should be considered to be encompassed within this invention.

The supply vessel 16 can be raised or lowered by extension and contraction of the support members 20. The extensible support members can be of any type including screw jacks or hydraulic pistons or can be a suspended type in which elevation and lowering of the supply vessel is accomplished by a hoist mechanism (not shown). A control device 26 energize the support members 20 to control the elevation and lowering of the supply vessel 16. Elevation and lowering according to automatic commands are also within the scope of this invention as will be explained.

A feed tube 28 provides fluid communication for liquified fat from the bottom of the supply vessel 16 to the deep frying vessel 14.

A level sensing device 30, shown here as a float-type device, senses when the level of fat in the deep frying vessel 14 has fallen below a predetermined level and thereupon enables the addition of replenishment fat from the supply vessel. In addition to the float-type level-sensing device 30 shown in the figure, other types of devices such as solid state or metallic-junction thermal detectors may be used to generate an electrical signal which is useable to control the level of fat in the deep frying vessel 14.

Control device 32 controls the transfer of fat. Control device 32 may be a valve mechanically controlled by the float-type level-sensing device 30 or may be an electric signalling device which generates electrical control signals whose use will be described in the description of operation.

Optionally, an electric pump 34 may be connected in the feed tube 28.

OPERATION

The supply vessel 16 is lowered to a convenient height on the support members 20 using the control device 26. A block of replenishment fat 18 is added to the supply vessel 16 without the necessity for high lifting of the awkward package. The replenishment fat 18 is melted and its temperature is raised to approximately cooking temperature by the heater 22.

a. Gravity Operation — When the fat in the supply vessel 16 is at approximately cooking temperature, the supply vessel 16 is elevated either automatically or manually until the fat level in the supply vessel 16 is near the fat level in the deep frying vessel 14. In one mode of operation, the supply vessel 16 is elevated until its bottom is at or above the desired fat level in the deep frying vessel 14. Level sensing device 30 and control device 32 mechanically meter the gravity-urged flow of fat into the deep frying vessel 14 as fat is depleted.

In another gravity embodiment, the control device 32 generates an electrical signal which energizes the support members 20 to elevate the supply vessel 16 until the fat flows by gravity through feed tube 28 into the deep frying vessel. When the fat level in the deep frying vessel 14 attains the desired level, the control device 32 generates a second electrical signal which causes the support members 20 to lower the supply vessel 16 until fat ceases to flow. As fat is depleted in the deep frying vessel 14, additional raising and lowering signals are generated by the control device 32 to further replenish the fat in the deep frying vessel 14.

b. Pump Operation — Control device 32 may optionally generate an electrical control signal which energizes pump 34, or a type well known in the art, when the fat level in the deep frying vessel is depleted below a predetermined level. Pump 34 thereupon pumps replenishment fat from the supply vessel 16 through the feed tube 28 into the deep frying vessel 14. When sufficient replenishment fat has been added, control device 32 cuts off pump 34.

What is claimed is:

1. In a deep fat fryer system, a heated fat supply reservoir and fat replenishment device comprising:
   a. a supply vessel;
   b. a deep frying vessel
   c. means for heating the contents of said supply vessel;
   d. means for sensing the fat level in said deep frying vessel; and
   e. means responsive to said sensing means for transferring an amount of fat from said supply vessel to said deep fat fryer;
   f. said sensing means comprising an electrical signal generating means operative to generate at least two electrical signal levels responsive to fat levels;
   g. means responsive to one of said two electrical signals to raise said supply vessel;
   h. means responsive to another of said two electrical signals to lower said supply vessel; and
   i. a feed tube connecting said supply vessel and said deep fat fryer.

2. The apparatus as recited in claim 1 wherein said means for heating is an electric heater.

3. The apparatus as recited in claim 1 wherein said means for heating is a fossil fuelled heater.

4. The apparatus as recited in claim 1, wherein said means for heating is a heat exchanger with said deep fat fryer.

* * * * *